United States Patent
Jan et al.

(10) Patent No.: US 9,299,031 B2
(45) Date of Patent: Mar. 29, 2016

(54) ACTIVE LEARNING ON STATISTICAL SERVER NAME EXTRACTION FROM INFORMATION TECHNOLOGY (IT) SERVICE TICKETS

(71) Applicant: International Business Machines Corporation, Armonk, NY (US)

(72) Inventors: Ea-Ee Jan, Ardsley, NY (US); Jian Ni, Ossining, NY (US); Niyu Ge, Chappaqua, NY (US); Xiaolan Zhang, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 259 days.

(21) Appl. No.: 13/901,872

(22) Filed: May 24, 2013

(65) Prior Publication Data

US 2014/0351176 A1 Nov. 27, 2014

(51) Int. Cl.
G06N 5/04 (2006.01)
G06N 7/00 (2006.01)
G06N 99/00 (2010.01)

(52) U.S. Cl.
CPC ............... *G06N 5/048* (2013.01); *G06N 7/005* (2013.01); *G06N 99/005* (2013.01)

(58) Field of Classification Search
CPC .................................................. G06N 5/048
See application file for complete search history.

(56) References Cited

U.S. PATENT DOCUMENTS

| 6,859,783 | B2 * | 2/2005 | Cogger et al. ................ 709/223 |
| 7,225,139 | B1 * | 5/2007 | Tidwell et al. ............... 705/7.15 |
| 2009/0125432 | A1 | 5/2009 | Deshpander et al. |
| 2011/0295898 | A1 * | 12/2011 | Grabarnik et al. ............ 707/780 |
| 2012/0259962 | A1 | 10/2012 | Bose et al. |
| 2013/0179736 | A1 * | 7/2013 | Gschwind et al. ............. 714/37 |
| 2014/0129536 | A1 * | 5/2014 | Anand et al. .................. 707/706 |

OTHER PUBLICATIONS

Anonymous; "A Method to Enable Efficient Ticket Dispatch in an IT Service Environment"; http://priorartdatabase.com/IPCOM/000219524; Jul. 5, 2012. pp. 1-7.

Woojin, P. et al.; "Applying natural language processing (NLP) based meta-data extraction to automatically acquire user preferences";I Proceedings of the First International Conference on Knowledge Capture, pp. 116-122, ACM; 2001.

Rakesh Agrawal et al., "Fast Algorithms for Mining Association Rules". Proceedings of the 20th VLDB Conference Santiago, Chile, 1994. pp. 1-13.

(Continued)

*Primary Examiner* — Alan Chen
(74) *Attorney, Agent, or Firm* — Louis J. Percello; Otterstedt, Ellenbogen & Kammer, LLP

(57) ABSTRACT

Access is obtained to a plurality of information technology services problem tickets. At least a first subset of the tickets include free text tickets with server names embedded in unstructured text fields. The server names are extracted from the first subset of the tickets via a statistical machine learning technique. Using the extracted server names, those of the first subset of the tickets from which the server names have been extracted are linked to corresponding server entries in a configuration information database to facilitate resolution of problems associated with the first subset of the tickets from which the server names have been extracted; and/or at least one of the extracted server names is identified as missing from a list of known server names.

20 Claims, 10 Drawing Sheets

(56) References Cited

OTHER PUBLICATIONS

Christian Borgelt's Web Pages "Apriori—Association Rule Induction / Frequent Item Set Mining". Downloaded from http://www.borgelt.net/apriori.html on May 16, 2013. pp. 1-2.

Rakesh Agrawal et al. "Mining Association Rules between Sets of Items in Large Databases (1993)". In Proceedings of the 1993 ACM SIGMOD International Conference on Management of Data, Washington DC (USA). pp. 1-10.

J. N. Darroch et al. "Generalized Iterative Scaling for Log-Linear Models." The Annals of Mathematical Statistics. 1972, vol. 43, pp. 1470-1481.

Christian Borgelt, "Recursion Pruning for the Apriori Algorithm." Proc. 2nd IEEE ICDM Workshop onFrequent Item Set Mining Implementations (FIMI 2003, Brighton, United Kingdom). CEUR Workshop Proceedings 126, 2004. pp. 1-2.

John Lafferty et al. "Conditional Random Fields: Probabilistic Models for Segmenting and Labeling Sequence Data", in Proceedings of the 18th International Conference on Machine Learning 2001 (ICML 2001), pp. 282-289.

Gengxin Miao et al. "Generative Models for Ticket Resolution in Expert Networks." KDD'10, Jul. 25-28, 2010. pp. 1-10.

Sangkyum Kim et al. "Polygraph: System for Dynamic Reduction of False Alerts in Large-Scale IT Service Delivery Environments." USENIX Annual Technical Conference, USENIX Association, (2011). pp. 1-6.

Adam L. Berger et al. "A Maximum Entropy Approach to Natural Language Processing." 1996 Association for Computational Linguistics, vol. 22 No. 1. pp. 39-71.

J. Finkel, T. Grenager, C. D. Manning, 2005. Incorporating non-local information into information extraction systems by Gibbs sampling. In Proceedings of the 43rd Annual Meeting on Association for Computational Linguistics, Jun. 2005 pp. 363-370.

J. Lenchner et al. "A service delivery platform for server management services." IBM J. Res. & Dev. vol. 53 No. 6 Paper 2 2009. pp. 2:1-2:17.

Adwait Ratnaparkhi. 1996. A Maximum Entropy Model for Part-Of-Speech Tagging, Proceedings of EMNLP 1997, University of Pennsylvania, pp. 133-142.

Ea-Ee Jan, Brian Kingsbury, 2010. Rapid and inexpensive development of speech action classifier for natural language call routing systems. IEEE workshop on spoken language technology. p. 336-341 (Abstract Only pp. 1-2).

Daniela Rosu, Winnie Cheng, Ea-Ee Jan, Naga Ayachitula, 2012. IEEE SOLI. Connecting the Dots in IT Service Delivery, pp. 410-415 (Abstract Only pp. 1-2).

Wikipedia Article "Incident Management" Apr. 25, 2013, downloaded from https://web.archive.org/web/20130425160217/http://en.wikipedia.org/wiki/Incident_management on Nov. 9, 2015, pp. 1-5.

Wikipedia Article Software configuration management Apr. 24, 2013, downloaded from https://web.archive.org/web/20130424102226/http://en.wikipedia.org/wiki/Software_configuration_management on Nov. 9, 2015, pp. 1-3.

Wikipedia Article Service catalog Apr. 25, 2013, downloaded from https://web.archive.org/web/20130425174651/http://en.wikipedia.org/wiki/Service_catalog on Nov. 9, 2015, pp. 1-3.

Daniela Rosu, Winnie Cheng, Ea-Ee Jan, Naga Ayachitula, 2012. IEEE SOLI. Connecting the Dots in IT Service Delivery, pp. 410-415 (Full Article).

* cited by examiner

Ticket 1: The server dif.gtq2.com is unavailable or not pingable by tiv.

Label: 0 0 1 0 0 0 0 0 0

Ticket 2: Please restart ESP service on AWEJSP03.

Label: 0 0 0 0 0 1

Ticket 3: Not able to open my lotus notes from onanywhere.xyz.com.

Label: 0 0 0 0 0 0 0 0 1

*FIG. 1*

| Label | Precision% | Recall% | F-measure% |
|---|---|---|---|
| Server | 95.75 | 90.64 | 93.12 |
| Non-server | 99.50 | 99.75 | 99.60 |

*FIG. 2*

| CRF w/ different features | Precision Mean% (Std%) | Recall Mean% (Std%) | F-measure Mean% (Std%) |
|---|---|---|---|
| CRF-F1 | 95.45 (0.29) | 91.33 (0.48) | 93.34 (0.23) |
| CRF-F2 | 95.61 (0.45) | 95.08 (0.41) | 95.34 (0.24) |
| CRF-F3 | 95.92 (0.44) | 95.40 (0.43) | 95.66 (0.23) |

*FIG. 3*

| Word | Dictionary fuzzy match | CRF | Human Evaluation |
|---|---|---|---|
| nraxa004.r.com | No | Yes | Yes |
| nbdzws222.com | No | Yes | Yes |
| fsgwds080 | No | Yes | Yes |
| pojbatwapp01.jvt.qa | No | Yes | Yes |
| var.usf.raleigh.com | No | Yes | Yes |

*FIG. 4*

|  | Client1 | Client2 | Client3 | Client4 |
|---|---|---|---|---|
| total ticket | 662 | 284 | 7637 | 1338 |
| CRF-F1 | 35.80% | 91.90% | 64.14% | 76.53% |
| CRF-F2 | 81.57% | 93.31% | 87.04% | 84.45% |
| CRF-F3 | 86.86% | 93.66% | 90.73% | 83.71% |
| fuzzy match | 92.00% | 93.64% | 90.00% | 0.15% |

*FIG. 5*

| Data | # Tickets | # Tokens |
|---|---|---|
| Training | 26,289 | 1,464,439 |
| Testing | 2,922 | 161,803 |

| Label | Precision | Recall | F |
|---|---|---|---|
| 1 | 0.8879 | 0.9067 | 0.8972 |
| 0 | 0.9978 | 0.9973 | 0.9975 |
| overall | 0.9952 | 0.9952 | 0.9952 |

Clean Tickets (hostname, fully qualified hostname, IP are in simple forms)
- AWCTXP27 - The free space of logical driveC:is less than (10.0%)
- AWCTXP15.AZLIFEM.AZL.PVT - No Response to Ping.
- The ESX host USLXSV61 (10.113.132.22) is not responding Sloppy Tickets (carriage return, quote, etc.)
- Hi, Please create a SEV 2 ticket to intel team with decription "EPICIISSERVER]; ntbackup of sys state failed"

Messy Tickets
- High Swap Space Usage (90.3%) rtps03xteca01.raleigh.ibm.comTicketGroup: ... NodeAlias: 129.39.23.77Manager: ...
- Msg xntpd is missing on Host(afi_us97uap324ampxb)> ... hostname <afi_us97uap324ampxb> ... missing on Host(afi_us97uap324ampxb)> ...

*FIG. 14*

| | #truth | #hyp | #correct | #error | #miss | Precision | Recall | F |
|---|---|---|---|---|---|---|---|---|
| Exp20 | 80970 | 77017 | 73538 | 3479 | 7432 | 0.95 | 0.91 | 0.93 |
| Exp21 | 51421 | 48307 | 45529 | 2778 | 5892 | 0.94 | 0.86 | 0.91 |
| Exp22 | 28638 | 28215 | 26748 | 1467 | 1890 | 0.95 | 0.93 | 0.94 |
| exp24 | 80059 | 76602 | 73085 | 3517 | 6974 | 0.95 | 0.91 | 0.93 |

ACTIVE LEARNING ON STATISTICAL SERVER NAME EXTRACTION FROM INFORMATION TECHNOLOGY (IT) SERVICE TICKETS

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic, and computer arts, and, more particularly, to information technology (IT) service management and analytics and the like.

BACKGROUND OF THE INVENTION

The success of IT service delivery depends, at least in part, on making strategic decisions based on insights from multiple business components. These decisions typically require a comprehensive examination of several IT service management processes, such as incident management, configuration management, and service request management. Forming such an encompassing view is a complex process.

Ticketing is a management process of IT service delivery. Customers typically express their requests in the form of tickets related to problems or configuration changes of existing systems.

SUMMARY OF THE INVENTION

Principles of the invention provide techniques for active learning on statistical server name extraction from it information technology (IT) service tickets. In one aspect, an exemplary method includes the step of obtaining access to a plurality of information technology services problem tickets. At least a first subset of the tickets include free text tickets with server names embedded in unstructured text fields. A further step includes extracting the server names from the first subset of the tickets via a statistical machine learning technique. A still further step includes, using the extracted server names, carrying out at least one of: (i) linking those of the first subset of the tickets from which the server names have been extracted to corresponding server entries in a configuration information database to facilitate resolution of problems associated with the first subset of the tickets from which the server names have been extracted; and (ii) identifying at least one of the extracted server names as missing from a list of known server names.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

ability to extract hostnames from ticket context
  ability to identify troublesome servers, i.e., those having a high volume of tickets
  ability to validate data quality in asset database These and other features and advantages of the present invention will become apparent from the following detailed description of illustrative embodiments thereof, which is to be read in connection with the accompanying drawings.

BRIEF DESCRIPTION OF THE DRAWINGS

FIG. 1 shows sample tickets with their labels, in accordance with an aspect of the invention;

FIG. 2 shows a non-limiting example of server name identification results, in accordance with an aspect of the invention;

FIG. 3 shows a non-limiting example of conditional random field (CRF) results, in accordance with an aspect of the invention;

FIG. 4 shows a non-limiting example of false positives, in accordance with an aspect of the invention;

FIG. 5 shows a non-limiting example of fuzzy match versus CRF results, in accordance with an aspect of the invention;

FIG. 14 shows examples of clean, sloppy, and messy tickets that can be handled in accordance with aspects of the invention;

DETAILED DESCRIPTION OF PREFERRED EMBODIMENTS

Figure 6:
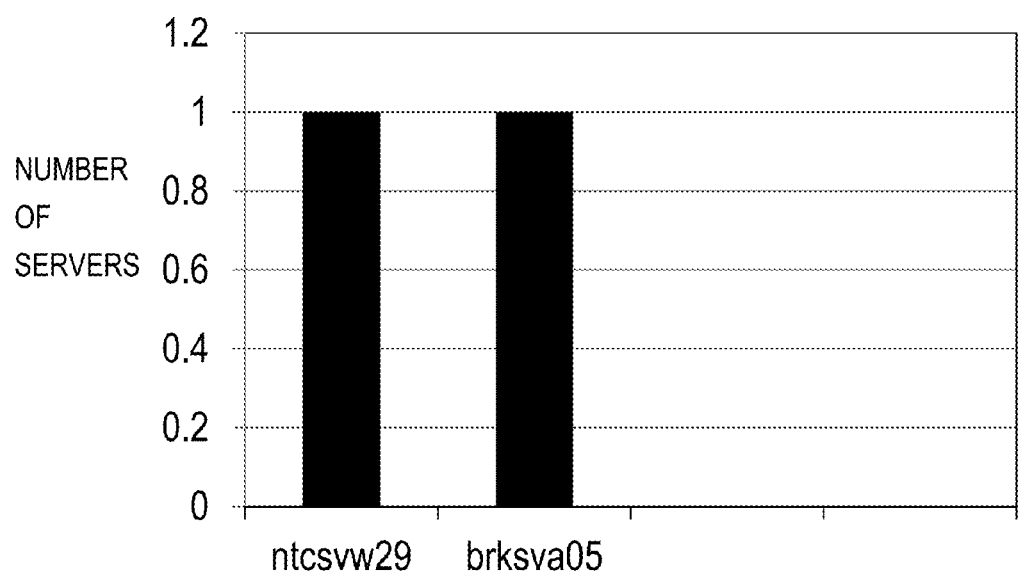
FIGS. 6 and 7 show non-limiting examples of ticket-to-server results, using fuzzy match and CRF, in accordance with an aspect of the invention.

As noted, ticketing is a management process of IT service delivery. Customers typically express their requests in the form of tickets related to problems or configuration changes of existing systems. Tickets typically contain a wealth of information which, when connected with other sources of information such as asset and configuration information, monitoring information, and the like, can yield new insights that would otherwise be impossible to gain from one isolated source. Linking these various sources of information is facilitated by a common key shared by these data sources; in one or more embodiments, the key is the server names. Unfortunately, due to historical as well as practical reasons, the server names are not always present in the tickets as a standalone field. Rather, they are embedded in unstructured text fields such as abstract and descriptions. Thus, automatically identifying server names in tickets is a pertinent step in linking various information sources. One or more embodiments provide a statistical machine learning method called Conditional Random Field (CRF) that can automatically identify server names in tickets with high accuracy and robustness. In one or more embodiments, such linkages can be leveraged to create new business insights.

As also noted, the success of IT service delivery typically depends on making strategic decisions based on insights from multiple business components. These decisions typically require a comprehensive examination of several IT service management processes, such as incident management, configuration management, and service request management. Forming such an encompassing view is a complex process. First, it typically involves a unification of various tools and data models that are produced by different business units independently. Second, it typically requires taking into account the human factors which may result in missing or inconsistent content. Third, as the service delivery business evolves, new problems arise that may demand previously unexplored concepts or features to be derived from the operations content. Thus, existing data models cannot be used and the new knowledge must be inferred from available content.

Recent research has focused on building semi-automated knowledge discovery tools that are capable of locating information across a variety of business units and data models. For example, data center operational issues, such as outages and IT system incidents, are recorded and tracked as tickets in IPC (Incident, Problem, Change) management systems. In another department, the data center asset management, a different set of system management tools, keeps track of the available servers in the data center and the hardware and software installed on each server. By linking the tickets and the server configuration details, one can learn about the top server features that lead to the creation of the tickets, and can drive targeted actions for productivity improvement. Also, one can learn how groups of servers with different hardware and software compare with respect to their ticket handling labor costs and equipment costs.

In some IT environments, legacy IPC and asset management systems are not integrated to provide a structured ticket field that captures an accurate reference to related servers. In other instances, although dedicated fields are available, the information might be missing or inaccurate because system administrators may have forgotten to capture it appropriately as they rush to close the ticket and meet productivity targets. Therefore, in a business-knowledge discovery framework that aspires to gain cross-business unit insights, text-mining on the ticket descriptions is advantageous in linking ticketing records and server configuration records. The tickets and the server configuration details are linked by the common server names. Therefore, finding server names in the tickets is a pertinent first step toward bridging the gap. Although ideally the ticketing application should provide users with a structured interface with a required 'server name' field, there are also many applications that allow users to enter free text. One or more embodiments address such free-text tickets. One or more embodiments provide a statistical machine learning method that can identify server names in unstructured ticket text data accurately and robustly.

Tickets comprise extensive details about the service requests and problem symptoms in unstructured fields such as the abstract, description, and resolution. Previous work on finding server names in tickets has been largely heuristic-based. Before processing the tickets, a dictionary of server references is first extracted from the server configuration database. Because the tickets consist mostly of free texts, well-formatted texts cannot be assumed. In fact, quotes, parentheses, and other special characters are frequently used around server information. Space delimiters are sometimes missing; prefixes and suffixes are added due to various system operations. In order to build heuristic rules, a set of tickets is set aside for rules training and creation as followed. Each ticket is tokenized, and the tokens are matched against the dictionary using fuzzy matching algorithms. The prefix and suffix matches between each token and dictionary entries are collected. Histograms are created for each prefix and suffix patterns. The patterns with highest frequency counts are used as heuristic rules. The regular expression pattern substitutions are then used for text processing over the entire domain of tickets.

There are at least two significant drawbacks of this approach. First, as with many heuristic-based approaches, the rules are often noisy and incomplete. By taking only the frequent ones, the system may suffer recall problems for failing to find those that are not following the rules. On the other hand, if all the rules are taken, the system may suffer precision problems for finding false server names. The second problem is caused by the fact that the rules are largely context independent. When a common word, for example, "discovery" is used for the server name, without context, a simple matching algorithm will lead to many false server detections.

One or more embodiments provide a statistical machine learning approach to discover server names. The model is sophisticated enough not only to identify server names robustly and precisely, but also discover server names that are absent in the dictionary.

A ticket includes a sequence of words (also called tokens, and in this document, "words" and "tokens" are used interchangeably). Each word in a ticket is either a server name or not. The problem of finding server names in a ticket can be cast as a sequential labeling problem. For each word w in the ticket, it is desired to assign a label $l \in \{0,1\}$ to it indicating whether or not the word is a server name: with 0 indicating the current word is not a server name and 1 indicating that it is.

One or more embodiments apply a statistical machine learning approach to address the ticket mining problem. Let:

$$W = (W_1, W_2, \ldots, W_n)$$

be a random vector representing the sequence of words in a ticket (with n words), and let $$L=(L_1, L_2, \ldots, L_n)$$

be a random vector representing the corresponding labels of the words.

Given a limited set of labeled training data, possibly with noise, it is desired to learn a probabilistic model that can describe the conditional distribution of P (L|W). Based on the probabilistic model, for any new ticket w, it is desired to infer the most likely labels l* for the words in the ticket:

$$l^* = \mathrm{argmax}_l P(L=l|W=w) \tag{1}$$

Given the inferred label vector l*, one or more embodiments can predict whether the ticket contains a server name or not.

Conditional random fields (CRFs) are a class of probabilistic graphical models that can be used to label or parse sequential data. For the ticket mining problem, W is a random vector representing the sequence of words in a ticket, and L is a random vector representing the corresponding labels of the words. A CRF models the conditional probability of the variables it is desired to predict (L) given the observed variables (W). It assumes that conditioned on W, the L forms a Markov random field with topology described by a graph G=(V, E). Vertex i∈V in the graph represents the random variable $L_i$, and the edges connecting the vertices specify the dependence relationship between the random variables.

Let clique(G) be the set of cliques in graph G, where a clique of a graph is a fully connected sub-graph of that graph. The distribution of L given W can be written as follows:

$$P(L=l|W=w) = \frac{1}{Z(w)} \prod_{C \in clique(G)} \phi_C(w, l_C) \tag{2}$$

In the equation, $\phi_C(w, l_C)$ is a local function defined on variables W and $L_C$, where $L_C=(L_i : i \in C)$, and Z(w) is the normalization constant such that $\Sigma_l P(P=l|W=w)=1$:

$$Z(w) = \sum_l \prod_{C \in clique(G)} \phi_C(w, l_C) \tag{3}$$

Unlike a traditional classifier which predicts the labels of the individual words in a ticket without considering the dependency of the labels, a CRF classifier can model such dependency and hence improve the accuracy. For example, a linear chain CRF models the dependency of the labels of neighboring words.

Often, an exponential family of distributions is considered, where a local function $\phi_C$ is a weighted summation of features (as we be discussed below, this form can be derived from a maximum entropy principle):

$$P_\lambda(L=l|W=w) = \frac{1}{z(w)} \exp\left\{ \sum_{C \in clique(G)} \sum_{1 \le k \le K} \lambda_k f_k(w, l_C) \right\} \tag{4}$$

In equation (4), $\{f_1, f_2, \ldots\}$ is a set of feature functions defined on the labels and the words, and $\{\lambda_1, \lambda_2 \ldots\}$ is a set of weights associated with the features. There is a weight λ for each feature $f$. Feature design and selection plays a significant role for the accuracy of the model, as will be discussed below.

Under the framework of supervised learning, consider a set of labeled data: $D=\{w^{(t)}, l^{(t)}\}_{t=1}^T$, where $w^{(t)}$ is the t-th ticket in the training data, and $l^{(t)}$ includes the labels of the words in that ticket. The (conditional) log likelihood of the data with feature weight parameter $\lambda=(\lambda_1, \ldots, \lambda_K)$ is:

$$l_D(\lambda) = \sum_{t=1}^T \log(P_\lambda(l^{(t)} | w^{(t)})) \tag{5}$$

In the parameter learning step (also known as the training step), it is desired to find the optimal weight vector λ* that maximizes the log likelihood:

$$\lambda^* = \mathrm{argmax} \, l_D(\lambda) \tag{6}$$

λ* is called the maximum likelihood estimator (MLE) of the feature weights. The resulting model $P_{\lambda^*}(L|W)$ also has the maximum entropy interpretation. The principle of maximum entropy states that the resulting probability distribution maximizes the (conditional) entropy (where $\tilde{P}(w)$ is the empirical distribution of the training data):

$$H(P) = -\sum_{w,l} \tilde{P}(w) P(l|w) \log P(l|w) \tag{7}$$

while at the same time meeting a set of constraints. The constraints are set by the training data. In other words, the model tries its best to maximize events seen in the training data, while assuming nothing of the unseen events.

In practice, a regularization term such as $L_2$ regularization is often added to the log likelihood to avoid over-fitting. There exist several techniques to search for the optimal parameters, including iterative scaling types of algorithms such as Generalized Iterative Scaling (GIS), Improved Iterative Scaling (IIS), and quasi-Newton methods like L-BFGS. The skilled artisan will be familiar with the techniques in and of themselves, and, given the teachings herein, will be able to adapt same to implement one or more embodiments of the invention.

After the optimal feature weights λ* are estimated from the training data, in the inference step (also known as the decoding step), for any new ticket w, it is desired to find the most likely labels l* of the words in w:

$$l^* = \mathrm{argmax}_l P_{\lambda^*}(L=l|W=w) \tag{8}$$

The max-product algorithm (a dynamic programming algorithm) can be used to compute l*. From the decoded labels, one or more embodiments can predict whether the ticket contains a server name or not.

For linear chain CRFs, the complexity of learning and inference grows linearly with the training and testing data size and the number of features, while it grows quadratically with the number of labels. More generally, for order-m CRFs, the complexity grows exponentially in m+1. When exact inference is not computationally feasible, it is possible to apply approximate inference methods such as loopy belief propagation or Gibbs sampling. The skilled artisan will be familiar with these methods in and of themselves, and, given the teachings herein, will be able to adapt same to implement one or more embodiments of the invention.

Selecting a good set of features is significant for the CRF classifier to produce accurate predictions. Without loss of generality, the features used by the probabilistic model (4) are binary-valued and can be represented as questions on the words. For example, a feature may be specified by $$f_k(w_i, l_i) = \begin{cases} 1 & \text{if } w_i \text{ contains one or more digits and } l_i = 1 \\ 0 & \text{otherwise} \end{cases}$$

This feature can be thought of asking the question "does word $w_i$ contain one or more digits and is it a server name?" If in the training data, the word under examination (the current token) does contain one or more digits, for example, $w_i$="snoopy12dog" and it is identified as a server name, then the above feature fires (i.e., takes value 1) and it will contribute to the conditional distribution in (4). Note that features with larger weights will contribute more to the distribution.

Purely by way of example and not limitation, three types of features were employed in conducting illustrative experiments.

Word Features:

The first type of feature examines the current word $w_i$ and the neighboring words around it. These features have the form $f_k(w_{I(i)}, l_i)$, where $w_{I(i)}$ contains certain neighboring words around $w_i$, and $l_i$ is the label associated with the current token $w_i$. For example, if $I(i)=\{i-2, i-1, i\}$, then $w_{I(i)}=(w_{i-2}, w_{i-1}, w_i)$ contains the two words to the left of the current token $w_i$ as well as $w_i$. The feature fires if $w_{I(i)}$ matches certain 3-gram words and $l_L$ takes certain value(s).

Pattern Features:

This type of feature inspects certain properties of the current word $w_i$ as well as the neighboring words around it, in conjunction with the label associated with the word. For example, this type of feature may check whether $w_i$ (and its neighboring words) contains numerical numbers or not, e.g., if $w_i$="abc001" and $l_i=1$, then the feature fires. As another example, it may check whether $w_i$ is of the form of an IP address, e.g., if $w_i$="10.252.2.157" and $l_i=1$, then the feature fires. Punctuation marks (e.g. ">" and "<") are also presented by this type of feature.

These features can be thought of as a regular pattern matching on the word. If a certain pattern is present in the word and its label takes certain value(s), the feature fires.

Higher Order Features:

The features introduced in the previous two subsections only examine the label of the current token $w_i$. These features are called first-order features. For a CRF classifier, it is also possible to include features that can model the dependency of the labels of neighboring words. These features are called higher-order features.

For example, a linear chain CRF examines the dependency of the labels of two consecutive words. To incorporate such dependency, for a word feature, $f_k(w_{I(i)}, l_i)$, it is possible to introduce another feature $f'_k(w_{I(i)}, l_{i-1}, l_i)$, which will fire if and only if $w_{I(i)}$ matches certain word sequence(s) and both the previous label and the current label take certain values. These are called second-order features.

EXAMPLES

CRF is a supervised learning method, which employs a set of training data. In its applications to other fields, e.g., Natural Language Processing (NLP), the annotated linguistic resource is often attainable from various agencies such as the Linguistic Data Consortium (LDC). Different conferences or workshops also coordinate common data sets for various algorithms and system integration comparison. In the service research area, however, although there is usually ample data for mining, there is virtually no annotated data for either supervised learning or evaluation.

In order to train the CRF classifier, labeled data is appropriate. Instead of spending a huge amount of manual effort in data annotation, an active learning/boot strapping approach can be employed. A dictionary (which could be incomplete and error prone) is first extracted from the server configuration database. It is then followed by a fuzzy match algorithm of the dictionary applied on the unstructured ticket data. As mentioned above, many free text tickets are ill-formed and may contain typographical errors, concatenations, shorthands, affixes (i.e., prefixes and/or suffixes), and so on. The incomplete and error-prone nature of the dictionary coupled with the ill-formatted tickets complicates the server name detection problem. Otherwise, it would be a simple table lookup to find the server names.

The fuzzy match rules are established by running the partial matches between each list in the dictionary with every token from the tickets. The partial match results are then summarized into the regular expression patterns. Although noisy, the dictionary is still useable, to some extent, to extract a reasonable initial training data set. The CRF classifier is then trained by this automatically labeled data. After the initial model is established, active learning can be applied to extract more data for further model improvement.

A total of 29,212 tickets (with a total of 1.5 M tokens from ticket abstract and description) were extracted from the process for use in the experiments. The table of FIG. 1 lists a few examples of tickets with the annotations for the experiments. In the annotation, 1 means that the token is a server name and 0 means it is not.

The tickets have been partitioned uniformly into 90% for training set and 10% for testing set. The partitions are repeated 10 times (round-robin) so every ticket has been tested once and the test set and training set are non-overlapping.

After the model is run on the test data, precision and recall metrics are used to evaluate the results. Precision measures how accurate the model is in predicting the labels. Recall measures how many of the server names the model can identify. Both metrics are useful, but both can be skewed if taken separately. Consider the query "Give me all the documents related to John Q. Public." Suppose one hundred documents are retrieved; eighty-five relate to John Q. Public—precision is 85/100 or 85%. But suppose there are 120 John Q. Public documents in truth—the results are missing 20. Recall is 85/120 or 71%. High recall without filtering out irrelevant results is typically not useful. Thus, both parameters, precision and recall, are important and should be balanced. In the formula for F-measure above, the factor of 2 is inserted such that "perfect" comes out as 1, i.e., 1 is a perfect F score.

A third metric, F-measure, combines precision and recall, and gives a more balanced evaluation. The F-measure is defined as:

$$F = \frac{2 \times \text{precision} \times \text{recall}}{\text{precision} + \text{recall}}$$

The table of FIG. 2 shows the initial results using n-gram features on the first partition data set. There are 26,290 tickets for training and 2,922 tickets for testing. In measuring the performance, it is of more interest to find the server names (the '1' label in the table of FIG. 1). The non-server ('0' label in the table of FIG. 1) rows have very high performance numbers.

Experiments were then conducted on the 10 fold partitions data set. Three different features sets are designed to explore the performance improvement. The first feature set, denoted as CRF-F1, includes the n-gram word features. The second feature set, CRF-F2, uses additional pattern features as discussed above. For example, is the token a common English word? Does the token contain both alphabetical and numerical characters? Is the token an IP4 or IP6 address? Is the token a punctuation mark? The third feature set, CRF-F3, uses CRF-F2 features with larger window sizes. All three sets of features use second-order features so the classifier is a linear chain CRF classifier. The results in the table of FIG. 2 are based on CRF-F1, which already achieves very good performance.

The table of FIG. 3 shows the average performance and the standard deviation of 10 folds partitions. The recall is improved substantially after the pattern features are introduced. More features yield slightly better performance in precision; however, they are somewhat flat across all three feature sets. The small amount of the standard deviations demonstrates the data sets are homogenous and the modeling framework works well when there is enough training data. The 96% of precision and 95% of the recall (from CRF-F3) mean that for the given ticket sets, 95% of the server names in the tickets can be identified; 5% of the server names are missed. Furthermore, from the proposed server names, 96% are indeed server names, only 4% are not server names.

In addition to the quantitative evaluation shown in the table of FIG. 3, preliminary qualitative evaluation is also carried out on a portion of the test data. A portion of the false negative cases, where the model predicts the token as non-server name whereas the fuzzy match indicates that it is a server name, were also inspected. It was determined that some of these cases arise because the sentences are incomplete. The ticket is cut off when it is over maximum length.

Further examination was conducted regarding 206 false positive cases where the dictionary-based fuzzy match tags a word as not a server name, while the CRF model tags it as a server name. These 206 cases were manually examined and 146 of them are actually server names. The table of FIG. 4 shows some examples.

It is noteworthy that the model learns and discovers new server names that are not in the dictionary with encouraging accuracy (146/206=71%). This can be a valuable tool for IT service delivery in general because it helps to automate the discovery process which is usually labor intensive.

In addition to the data set in the table of FIG. 3, experiments were also run on four additional data sets which were evaluated manually. Each set of tickets is from one particular client. The training data is the complete ticket data except the given client; thus the test data is somewhat blind to the training procedure. This setup can be used to evaluate the model robustness against new data. In this experiment, three sets of the data have high 90% of fuzzy matching rate. These data can be used to compare the fuzzy match to an approach in accordance with one or more embodiments. The fourth set has only 0.2% fuzzy match rate. It implies that the dictionary for that set is impaired.

The table of FIG. 5 shows the results. The $2^{nd}$ row illustrates the ticket size for a client. The $6^{th}$ row "Fuzzy Match" shows the percentage of tickets which contain a server name according to the Fuzzy match. For client 4 in the experiment, out of 1338 tickets, fuzzy match finds server names in only 0.2% of the tickets. The $3^{rd}$ to $5^{th}$ columns show the percentage of tickets that contain a server name extracted by CRF with various feature sets.

As can be seen from the table of FIG. 5, the performance of CRF-F1 is not consistent for client 1, 2 and 3. It performs reasonably well on client 2 but not for client 1. The CRF-F2 and CRF-F3 yield more consistent results for all three clients. The CRF-F3 clearly demonstrates the best performance. The evaluation shows that the CRF model without dictionary can achieve very competitive performance comparing to fuzzy match with dictionary.

Upon manual inspection, some of Client 1's tickets are much different than the rest of the tickets. The performance degradation is more significant. By comparing the table of FIG. 3 and the table of FIG. 5, the n-gram word features (CRF-F1) might work reasonably well if the test data is similar to training data. However, additional feature sets and larger window size make the CRF model more robust against unseen data.

The dictionary-based fuzzy matching performs poorly on Client 4 because the majority of the Client 4 dictionary is missing. The CRF approach finds much more server names. When the dictionary is impaired and the fuzzy match struggles, the CRF approach in accordance with one or more embodiments can be a useful tool to extract the server name information. In addition, these server names extracted from Client 4 can be used to validate the Client 4 server databases. This can be a very good diagnosis tool to investigate possible reasons for the impaired data source.

One purpose of finding server names in tickets is to gain business insights into customers' problems. Accurate identification of server names enables IT delivery service to compute and enhance business statistics. A significant statistic in servicing tickets is the ticket-to-server ratio, which shows how tickets are related to a particular server. The higher the ratio is, the more problematic the server is. This statistic enables the IT delivery service to prioritize the workload, giving more urgency and attention to servers with many tickets. The ability to accurately uncover server names in the tickets directly impact the insight gained from the statistic.

Figure 7:
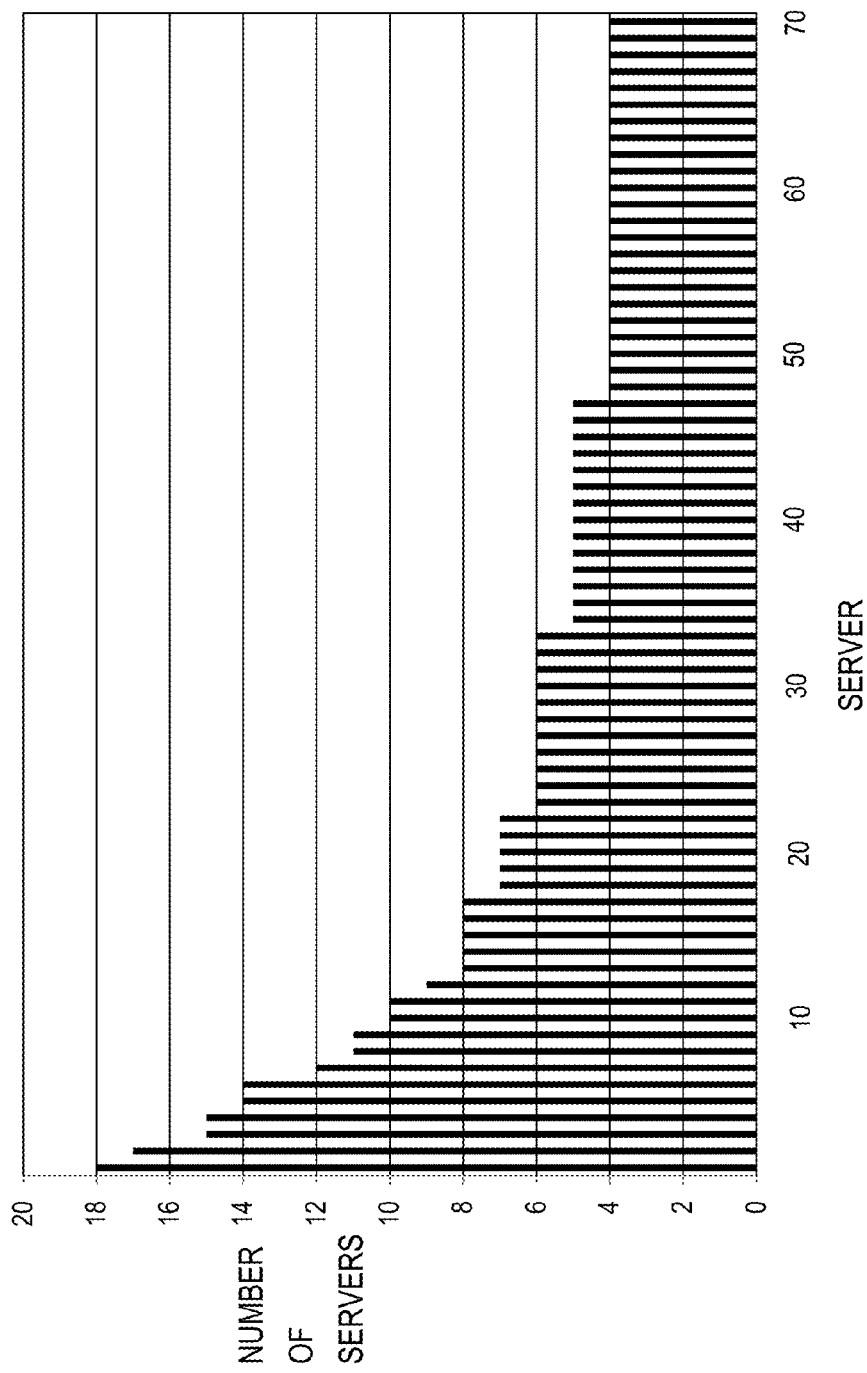

FIGS. 6 and 7 show two distributions of the ticket-to-server statistic. FIG. 6 shows results from the naïve approach of dictionary-based fuzzy matching and FIG. 7 illustrates results from the CRF approach of finding server names. These results are based on the ticket data from client-4 discussed in the table of FIG. 5. The X-axis shows the server names in FIG. 6 and at arbitrary server number in FIG. 7 and the Y-axis shows the number of tickets for that server. The fuzzy match only finds two tickets with server names in them. It is evident from the figures that more meaningful distribution is found based on the CRF approach. From FIG. 7, one can try to diagnose top problems servers, corresponding to the arbitrary lower server numbers at the left side of the X-axis, to find out if there are easy fixes to reduce the tickets.

Another scenario is the server to severity=n ratio analysis. Every ticket has a severity value associated with it. One can calculate ticket to server ratio based on severity=1 to help IT engineering to address those high priority troublesome servers.

One or more embodiments thus provide a statistical machine learning model for detecting server names in free text tickets. The server names are keys to link the tickets with various resources from other business units in IT service delivery. Without knowing the server names, knowledge from different content domains remains separate and disconnected. With server names, the information can be integrated. One or more embodiments use the machine learning approach to facilitate the capture of meaningful business insight. Finding sever names that are absent in the dictionary further supports the effort of data validation. Relevant business units can be alerted when a server is present in the tickets but absent in the dictionary. The scenario serves not only as a warning sign for data integrity issues but also a timely indication that the customer data may be incomplete, in which case the customer should be contacted to resolve the inconsistency.

Thus, many statistical natural language processing (NLP) techniques can be applied to help solve IT service problems. In one or more embodiments, NLP methods are used to automatically process computer service tickets to find host names with high accuracy (near 90%) and/or statistical business analytics are applied to the resulting information to reveal insightful patterns and trends. The automated pipeline not only saves human labor and resources, but also discovers intelligent features that aid business processes.

As noted above, IT service companies typically have databases of machines and hardware specifications. They also receive service tickets from clients. But the two are not always connected. In one or more embodiments, the key to connect the hardware database to the tickets is the host name. A natural first problem in servicing a ticket is to find the host name. Although there are ticketing applications that present the user with a structured interface with a required 'hostname' field, there are also many applications that allow user to enter free text. One or more embodiments address the free-text ticket.

Traditionally, host names in a free-text ticket are identified by keyword matching against a given dictionary. This simple approach suffers recall problems. Ill-formatted texts and incomplete dictionaries are two significant factors that contribute to the recall problem. In real life scenarios, well-formatted texts cannot be assumed. Users frequently make mistakes. For example, the user might concatenate the host with the next content word. The problem of incomplete dictionaries stems from the dynamic nature of real life business processes. The host repository does not always get updated in a timely fashion when clients, hardware or infrastructure changes. The task in processing host names in tickets has two purposes; it is desirable to not only identify host names in the tickets but also discover new host names with which to update the dictionary. Advantageously, this twofold goal is achieved in one or more embodiments by processing the host names with high precision and high recall. The CRF approach has been discussed above. Alternative embodiments employ Maximum Entropy, a well-established statistical NLP method, to build a precise and robust host name identifier.

One aspect that is very different in solving real service problems in industries is the lack of annotated data. Although raw, un-annotated tickets are abundant, it is often the case that human-labeled data is not available. The lack of supervised data is a problem not only for training, but also for evaluation because there is no truth. Several exemplary ways to overcome this difficulty are set forth herein.

One or more embodiments cast the host name identification problem as a sequential data labeling problem. The modeling process is analogous to that of part-of-speech tagging in that it is desired to label each token in the ticket with a label. However, in one or more embodiments, the label is simplified and has one of two values {1, 0}, with '1' identifying the token as a host name and '0' otherwise. Unlike part-of-speech tagging where current decisions depend on previous decisions, in finding host names there is not much dependency among decisions. A previous decision of '0' (i.e. not a host name) does not help the decision as to whether the next token is a host name; therefore, a Hidden Markov Model (HMM) is typically not applicable. Instead, some embodiments use a simple Maximum Entropy (MaxEnt) model. The following set of equations describes the problem and the maximum entropy model:

$$L^* = \underset{L \in \{L\}}{\operatorname{argmax}} p(L \mid W) \quad (9)$$

$$p(L \mid W) = \frac{1}{Z} \exp \sum_i \lambda_i \phi_i(W, L) \quad (10)$$

where W is a word vector representing a ticket, L is a label vector the model will predict, and p(L|W) is the MaxEnt model of predicting L given W. In equation (10), Z is a normalizing factor, φs are binary feature functions, and the λs are the weights associated with the features.

In one or more embodiments, two features are designed for the model, a bi-gram feature and a pattern feature. The bi-gram feature looks at two words to the left and two words to the right of the current word. The pattern feature is a Boolean feature with 1 indicating the word fits the pattern and 0 otherwise. The pattern sought for is a regular expression that looks for a combination of alphabetical characters, digits, and domain names (such as .com, .net, etc.).

At least some aspects of text analytics research in the service industry are significantly different from the hard core natural language research. For example, although there is usually ample data for mining, there is virtually no annotated data for either supervised learning or for evaluation. One or more embodiments address this issue for the host name problem.

In order to train a MaxEnt classifier, labeled data should be obtained. In addition to the tickets, one or more embodiments also have available machine databases from which to obtain a hostname dictionary. The dictionary is incomplete and error prone. Also, many tickets are ill-formed containing typographical errors, concatenations, short-hands, and so on. Although noisy, the dictionary is still somewhat useable to some extent and one or more embodiments use it as a bootstrapping device with which to annotate the data. Through this technique, some data, albeit noisy, is obtained. The MaxEnt classifier is then trained on this labeled data.

Figures 10, 11, 12:
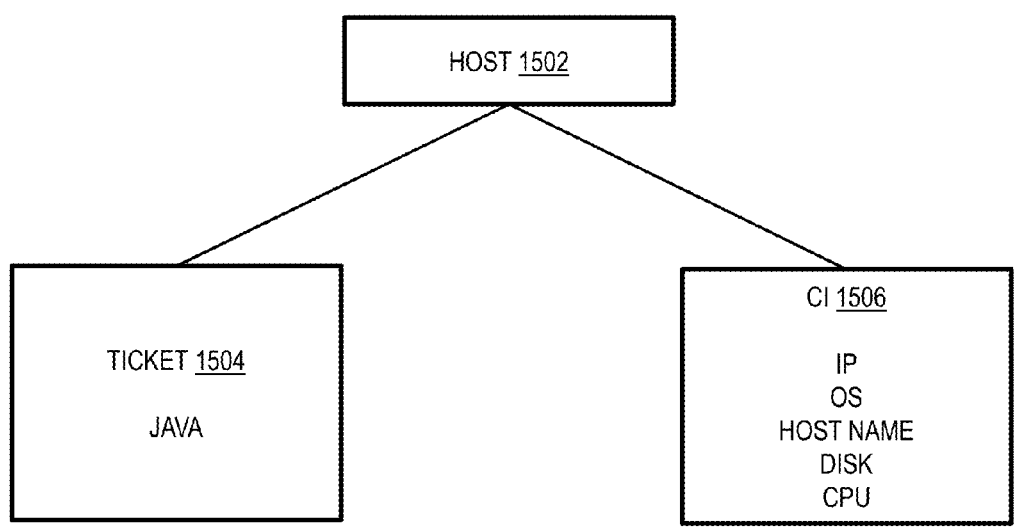
FIG. 10 shows an exemplary ticket data set-up, in accordance with an aspect of the invention.
FIG. 11 shows a non-limiting example of host name results, in accordance with an aspect of the invention.
FIGS. 12 and 13 show how host name serves as a key or link between a ticket and a configuration information database, in accordance with an aspect of the invention.

The table of FIG. 10 shows the data setup and the table of FIG. 11 shows the MaxEnt results. There are total 29,211 tickets which are divided into training (90%, 26,289 tickets) and testing (10%, 2,922 tickets). In measuring the performance, it is typically of greater interest to find the host names (the '1' rows in the table of FIG. 11). The '0' rows have very high performance numbers, but are less interesting, in at least some instances, because the majority of the tokens are not host names.

One or more embodiments thus provide a real application of NLP techniques on processing and mining IT service tickets. Some embodiments employ a robust application of the Maximum Entropy method to find host names in tickets.

As noted, one or more embodiments are directed to extraction of server and/or host names from tickets. Tickets are issued in response to problems. This is a well-defined process; i.e., tickets per se are well-known. Currently, the machines (servers or hosts) related to tickets are not clearly specified. Tickets can relate to zero, one, or multiple machines. Stated in another way, the customer is typically focused on the problem the customer desires to solve, not the server or host name.

In another aspect, it is also desirable to identify machines that are problem-prone. Thus, it is desirable to be able to determine from the ticket the host name and the nature of the issue. Tickets are typically text created by a customer service center based on a call, e-mail, or other customer communication related to the problem. One or more embodiments parse this ticket text to determine what server is causing the trouble.

Some tickets are created automatically; e.g., if remaining disk space is below 5%, issue a warning; if remaining disk space is below 2%, issue an emergency ticket. No human involvement is needed. Automatic ticket creation may be done, for example, with a monitoring agent; for example, it may be possible to program the agent to insert the host name in the ticket. Other tickets, on the other hand, result from a person calling in a problem. If the host name is known, it is possible to access a database (DB) and look up parameters such as OS, manufacturer, number of CPUs, disk space, and so on—these are referred to as configuration items (CI). Refer to FIG. 12. Host name 1502 serves as a link between the ticket 1504 and the CI 1506. In the non-limiting example, the ticket 1504 indicates a problem with Java. It is desired to have the computer help extract the host name from ticket. In general, the host name may or may not be present in the ticket. Some tickets may have multiple host names. One or more embodiments deal with the case where the host name is present in the ticket, and the problem of how to extract it.

As noted above, another issue in at least some cases is lack of training data. One or more embodiments employ an active learning style.

Figure 13:
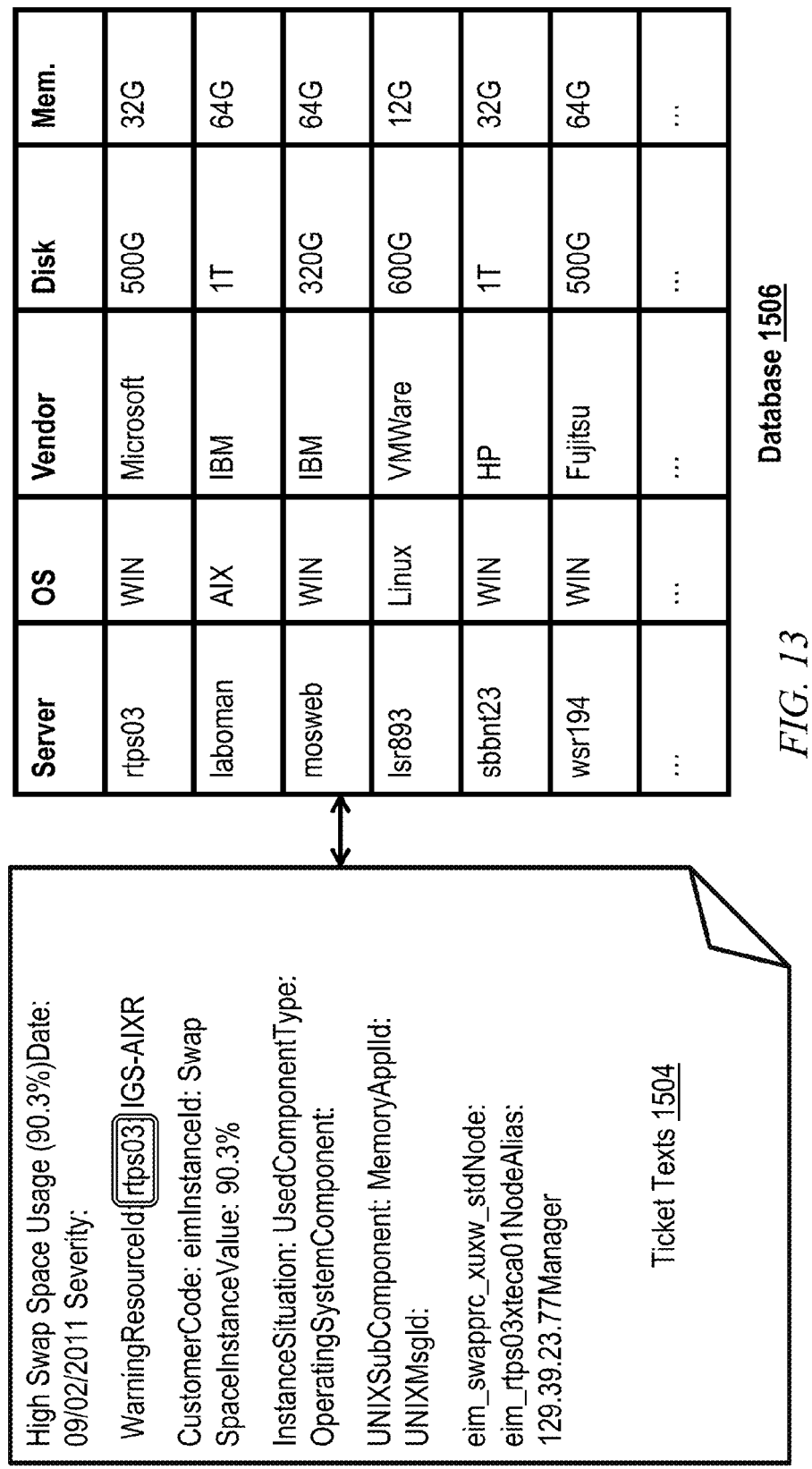

Still referring to FIG. 12, CI database 1506 provides, for example, IP address, operating system (OS), hostname, disk configurations, CPU type, etc. Matching can be carried out on the host name. After matching, training data (albeit imperfect) is available. In essence, one or more embodiments use machine-labeled data for training due to lack of a human-labeled training corpus. Refer also to FIG. 13 for additional examples of ticket texts and database content.

FIG. 14 shows additional examples of how complicated the tickets can be—note missing spaces, punctuation errors, etc. Some embodiments use the hostname in the context of the text of the rest of the ticket, in a manner analogous to using the language model together with the acoustic model in speech recognition, although here, data is textual not audio.

Some embodiments use an improved text processing approach. Consider, e.g., the case when one or more of the following terms appear in the server name:
who
test
info
backup
global
admin
service
log
tsm
creation
syslog
issues
server
db2
review
host name These words, if used in the server name, create frequent false alarms. These servers should preferably match FQHN (fully qualified host name) or IP (internet protocol) address. In some cases, a quick fix on tools can be carried out by replacing host name by either FQHN or IP. In some cases, a language model, which takes into account the context, is used to determine whether a common English word is being used as a common English word or forms part of a host name.

Figures 15, 16:
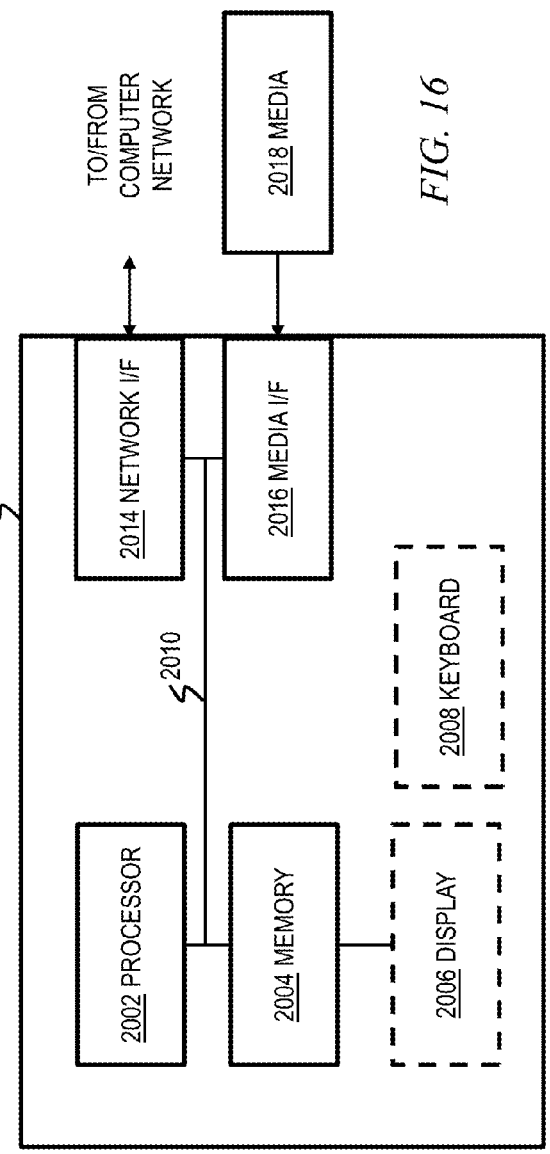
FIG. 15 shows exemplary server annotation in accordance with aspects of the invention.
FIG. 16 depicts a computer system that may be useful in implementing one or more aspects and/or elements of the invention.

FIG. 15 shows non-limiting exemplary results for server annotation without assets for CRF; these results are believed to be quite promising.

In a bootstrapping approach, validate precision and recall errors. If the errors are due to reference errors from initial fuzzy match, modify/clean up the truth and retrain the model. Recall error clean-up is typically required due to dictionary incompleteness. Precision error clean-up is typically required due to false alarm(s) in initial fuzzy match.

Thus, as noted, IT service tickets usually related to issues with particular servers. Server name can be one aspect of key information to analyze business insight from these tickets. If the tickets include unstructured text, it can be a challenge to extract server name from IT service tickets. From recently available asset database, which contains significant amounts of server information being managed by IT service provider (s), asset database can be used as dictionary to extract server name information from ticket(s). However, due to noisy data, exact dictionary match may not yield acceptable results.

For training, some embodiments use dictionary (extracted from asset database) look up with fuzzy matches and robust tokenizer to extract first iterations of hostname; then use data from a first iteration as a training/development data set to, as part of a decoding process, train a statistic model to extract additional host name and also clean up and improve the precision on the first iteration results. One or more embodiments advantageously require almost no human efforts on data annotation.

One or more embodiments first extract a dictionary of host name from asset database, then develop a robust tokenizer (text preprocessor) and carry out text normalization using rules learned semi-automatically. Furthermore, one or more embodiments then perform exact match between dictionary and normalized text (this is the first iteration result), use first iteration results to train statistic tagging model using statistical modeling algorithm (e.g., Maximum entropy (MaxEn) or Conditional Random Field (CRF)); and then decode the data using the model. In at least some cases, check the precision errors. Some errors are due to noisy data of dictionary. In some cases, enrich the dictionary and continue the iterations to improve the training data quality and improve the model.

One or more embodiments are directed to a computer system including one or more memories, one or more CPUs, one or more disk drivers, and one or more network connections. A statistical model is stored in the system. There are tickets which are digital representation of the IT incidents. The models is used to extract information from the tickets. The model can be trained using either well labeled training data or with semi-automatic labeled data with limited human labors.

The information extracted from tickets using the model can be server name, application name and others.

In some instances, tags are defined. For the example of server name extraction, two tags are defined: server/non-server. For middleware applications, non-middle ware/middleware tags can be defined.

The training data can be prepared, for example, by fuzzy match, which uses very limited human labors or human labeling, using tags defined as above.

The model can be developed using any tagging approach, for example, conditional random field (CRF), supporting vector machine (SVM), maximum entropy (MaxEn).

The model can be bootstrapped.

In a fuzzy match aspect, a computer system includes one or more memories, one or more CPUs, one or more disk driver, and one or more network connections. A data structure is stored in one or more of the memories including a dictionary of terms; each term is associated with one or more attributes related to the respective term. One or more text documents are stored in one or more of the memories or disk drives; the text documents have a plurality of words.

The text documents can be tickets, messages, reports, memos, or the like.

In some cases, the terms in the dictionary represent computer assets (e.g., a server, an operating system, a memory specification, number of CPUs, application installed, hardware configuration, and/or software configuration).

The attributes can include, for example, a server model number, resource name, resource part, vendor, and/or machine type.

In some cases, the similarity comparison determines the degree of similarity between one or more of the terms and one or more of the following in the text document: a word, a word sequence, a text pattern, a generalization of a word (generic concept, hierarchy of terms), a context, an association between two or more words, an association with known terms, and/or a part of speech/grammar.

In some cases, the respective term with a similarity score above a threshold is permanently associated with one of the ambiguous terms.

Some embodiments include the fuzzy match between the asset and the tickets, as well as the extraction of information, e.g. server name, without fuzzy match (e.g. using a statistical modeling technique). To train the model, the training data, which can come from the first part with limited human efforts, is employed. Some embodiments use Conditional Random field as the statistical modeling approach, and fuzzy match results as training data. Good performance can be achieved for host name extraction without human labor efforts for data labeling.

Figure 8:
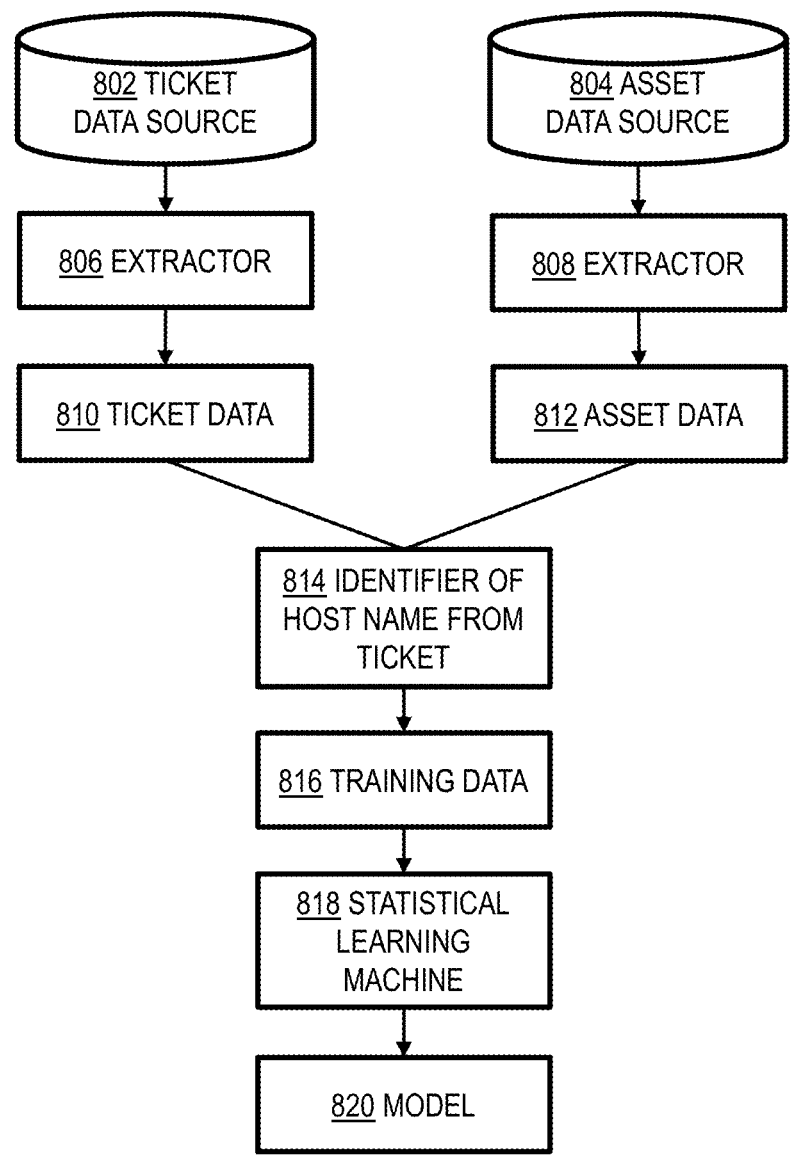
FIG. 8 shows a block diagram for training, in accordance with an aspect of the invention.

FIG. 8 shows an exemplary block diagram for training. Extractor 810 extracts ticket data 810 from ticket data source 802. Extractor 808 extracts asset data 812 from asset data source 804. In 814, host names are identified from the ticket data, taking into account the asset data, manually or via a computer program. This yields training data 816 used by statistical learning machine 818 to train model 820.

Figure 9:
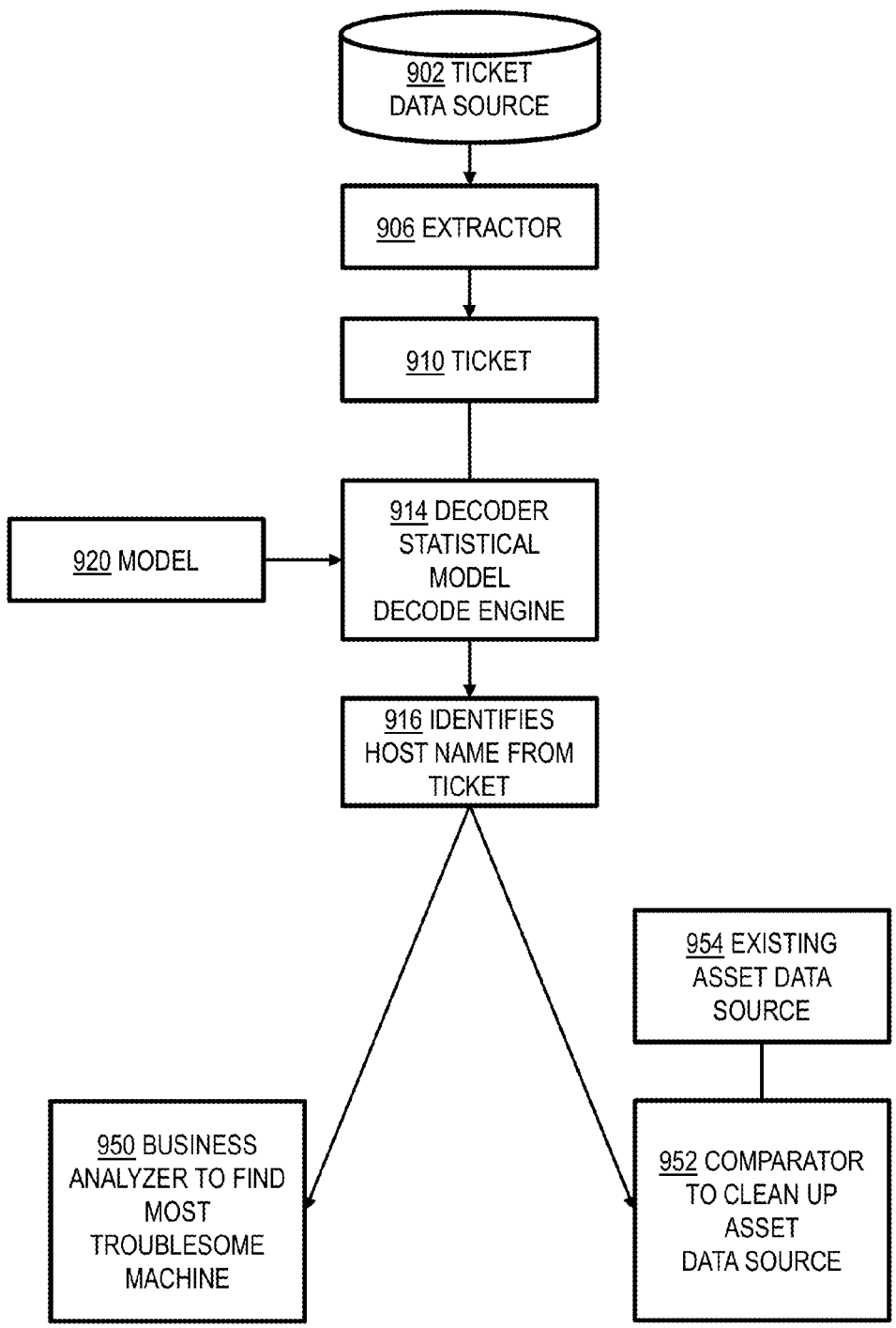
FIG. 9 shows a block diagram for run time, in accordance with an aspect of the invention.

FIG. 9 shows an exemplary block diagram for run time. Extractor 906 extracts ticket 910 from ticket data source 902. A decoder 914 (e.g., a statistical model decode engine) uses model 920 (e.g., model 820 produced in FIG. 8) to identify the host name from the ticket as at 916. Business analyzer 950 analyzes this data to find the most troublesome machine(s). Comparator 952 uses the data to clean up existing asset data source 954; e.g., to add servers that were not listed in source 954 but were found in the process of FIG. 9.

Given the discussion thus far, it will be appreciated that, in general terms, an exemplary method, according to an aspect of the invention, includes the step of obtaining access to a plurality of information technology services problem tickets 1504. At least a first subset of the tickets include free text tickets with server names embedded in unstructured text fields (i.e., some or all of the tickets are free text tickets). This step could be carried out using extractor 906. A database program is a non-limiting example of a technique to implement 802, 806; 804, 808; and 902, 906. Any kind of data structure or file structure can be used; with an actual data store and code to carry out queries. For example, SQL or other database queries could be used, or custom code could be written in a language that is suitable for text processing such as Perl, JAVA, C, etc. Spreadsheets such as Excel or the like are another option.

A further step includes extracting the server names from the first subset of the tickets via a statistical machine learning technique (e.g., applying a conditional random field approach or a maximum entropy approach). This step can be carried out with engine 914 which can use CRF or maximum entropy, for example.

An even further step includes, using the extracted server names, carrying out at least one of the following:

- linking those of the first subset of tickets, from which the server names have been extracted, to corresponding server entries in a configuration information database 1506 to facilitate resolution of problems associated with the first subset of the tickets from which the server names have been extracted. See, e.g., business analyzer 950 which can be implemented in a database by running queries against a configuration item database to try to find entries linked to the server name, but could also use spreadsheets or custom code as described above.
- identifying at least one of the extracted server names as missing from a list (e.g., dictionary and/or CI database) of known server names. See, e.g., comparator 952 which can be implemented in a database by running queries against data source 954 to see if there is a match for a discovered sever name, but could also use spreadsheets or custom code as described above.

As explained, for example, with regard to FIG. 7, in some cases an additional step includes grouping the first subset of the tickets to at least one of: (i) the host names (FIG. 7); and (ii) parameters corresponding to the host names (e.g., OS), so as to identify at least one of trouble-prone hosts and trouble-prone parameters. Some embodiments, as discussed, identify trouble-prone host-parameter combinations.

It will be appreciated that, in one or more embodiments, in the extracting step, the statistical machine learning technique is a non-heuristic technique and/or is carried out without keyword matching.

In addition to decoding tickets to find host names, and various applications thereof, one or more embodiments also address training, which can be carried out as a stand-alone process, or as part of an overall method including decoding. Accordingly, some embodiments further include building a model for use by the statistical machine learning technique by: obtaining access to the configuration information database; extracting a server dictionary from the configuration information database by carrying out a fuzzy match algorithm to obtain semi-truthful training data; and training the model on the semi-truthful training data.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 16, such an implementation might employ, for example, a processor 2002, a memory 2004, and an input/output interface formed, for example, by a display 2006 and a keyboard 2008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 2002, memory 2004, and input/output interface such as display 2006 and keyboard 2008 can be interconnected, for example, via bus 2010 as part of a data processing unit 2012. Suitable interconnections, for example via bus 2010, can also be provided to a network interface 2014, such as a network card, which can be provided to interface with a computer network, and to a media interface 2016, such as a diskette or CD-ROM drive, which can be provided to interface with media 2018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 2002 coupled directly or indirectly to memory elements 2004 through a system bus 2010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 2008, displays 2006, pointing devices, and the like) can be coupled to the system either directly (such as via bus 2010) or through intervening I/O controllers (omitted for clarity).

Network adapters such as network interface 2014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" or "host" includes a physical data processing system (for example, system 2012 as shown in FIG. 16) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 2018 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, data extraction module to implement 806, 808, and/or 906, a statistical model decode engine module to implement 914, and at least one of a business analyzer module and a comparator module to implement 950, 952 respectively. The method steps can then be carried out using the distinct software modules and/or sub-modules of the system, as described above, executing on one or more hardware processors 2002. Other modules can be implemented to implement other components, as shown, for example, in FIGS. 8 and 9. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining access to a plurality of information technology services problem tickets, at least a first subset of said tickets comprising free text tickets with server names embedded in unstructured text fields;
   extracting said server names from said first subset of said tickets via a statistical machine learning technique; and
   using said extracted server names, carrying out at least one of:
   linking those of said first subset of said tickets from which said server names have been extracted to corresponding server entries in a configuration information database to facilitate resolution of problems associated with said first subset of said tickets from which said server names have been extracted; and
   identifying at least one of said extracted server names as missing from a list of known server names.

2. The method of claim 1, wherein said extracting step comprises applying a conditional random field approach.

3. The method of claim 1, wherein said extracting step comprises applying a maximum entropy approach.

4. The method of claim 1, further comprising grouping first subset of said tickets to at least one of:
   said host names; and
   parameters corresponding to said host names;
   to identify at least one of trouble-prone hosts and trouble-prone parameters.

5. The method of claim 4, further comprising identifying trouble-prone host-parameter combinations.

6. The method of claim 1, wherein, in said extracting step, said statistical machine learning technique comprises a non-heuristic technique without keyword matching.

7. The method of claim 1, further comprising building a model for use by said statistical machine learning technique by:
   obtaining access to said configuration information database;
   extracting a server dictionary from said configuration information database by carrying out a fuzzy match algorithm to obtain semi-truthful training data; and
   training said model on said semi-truthful training data.

8. The method of claim 1, wherein said using of said extracted server names comprises at least linking those of said first subset of said tickets from which said server names have been extracted to corresponding server entries in said configuration information database to facilitate resolution of problems associated with said first subset of said tickets from which said server names have been extracted.

9. The method of claim 1, wherein said using of said extracted server names comprises at least identifying at least one of said extracted server names as missing from said list of known server names.

10. The method of claim 1, further comprising providing a system, wherein the system comprises distinct software modules, each of the distinct software modules being embodied on a computer-readable storage medium, and wherein the distinct software modules comprise a data extraction module, a statistical model decode engine module, and at least one of a business analyzer module and a comparator module;
wherein:
said obtaining is carried out by said data extraction module executing on at least one hardware processor;
said extraction is carried out by said statistical model decode engine module executing on said at least one hardware processor; and
said at least one of linking and identifying is carried out by a corresponding one of said at least one of said business analyzer module and said comparator module executing on said at least one hardware processor.

11. A non-transitory computer readable medium comprising computer executable instructions which when executed by a computer cause the computer to perform the method of:
obtaining access to a plurality of information technology services problem tickets, at least a first subset of said tickets comprising free text tickets with server names embedded in unstructured text fields;
extracting said server names from said first subset of said tickets via a statistical machine learning technique; and
using said extracted server names, carrying out at least one of:
linking those of said first subset of said tickets from which said server names have been extracted to corresponding server entries in a configuration information database to facilitate resolution of problems associated with said first subset of said tickets from which said server names have been extracted; and
identifying at least one of said extracted server names as missing from a list of known server names.

12. The non-transitory computer readable medium of claim 11, wherein said extracting comprises applying a conditional random field approach.

13. The non-transitory computer readable medium of claim 11, wherein said extracting comprises applying a maximum entropy approach.

14. The non-transitory computer readable medium of claim 11, wherein, in said extracting, said statistical machine learning technique comprises a non-heuristic technique without keyword matching.

15. The non-transitory computer readable medium of claim 11, wherein said computer-executable instructions comprise distinct software modules, each of the distinct software modules being embodied on said non-transitory computer readable medium, and wherein the distinct software modules comprise a data extraction module, a statistical model decode engine module, and at least one of a business analyzer module and a comparator module;
wherein:
said data extraction module obtains said access;
said statistical model decode engine module extracts said server names; and
said at least one of a business analyzer module and a comparator carries out said at least one of linking and identifying.

16. An apparatus comprising:
a memory; and
at least one processor, coupled to said memory, and operative to:
obtain access to a plurality of information technology services problem tickets, at least a first subset of said tickets comprising free text tickets with server names embedded in unstructured text fields;
extract said server names from said first subset of said tickets via a statistical machine learning technique; and
using said extracted server names, carry out at least one of:
linking those of said first subset of said tickets from which said server names have been extracted to corresponding server entries in a configuration information database to facilitate resolution of problems associated with said first subset of said tickets from which said server names have been extracted; and
identifying at least one of said extracted server names as missing from a list of known server names.

17. The apparatus of claim 16, wherein said at least one processor is operative to extract by applying a conditional random field approach.

18. The apparatus of claim 16, wherein said at least one processor is operative to extract by applying a maximum entropy approach.

19. The apparatus of claim 16, wherein said statistical machine learning technique comprises a non-heuristic technique without keyword matching.

20. The apparatus of claim 16, further comprising a plurality of distinct software modules, each of the distinct software modules being embodied on a computer-readable storage medium, and wherein the distinct software modules comprise a data extraction module, a statistical model decode engine module, and at least one of a business analyzer module and a comparator module;
wherein:
said at least one processor is operative to obtain by executing said data extraction module;
said at least one processor is operative to extract by executing said statistical model decode engine module; and
said at least one processor is operative to carry out said at least one of linking and identifying by executing a corresponding one of said at least one of said business analyzer module and said comparator module executing on said at least one hardware processor.

* * * * *